(12) United States Patent
Kaneko et al.

(10) Patent No.: US 8,757,687 B2
(45) Date of Patent: Jun. 24, 2014

(54) CRUSH BOX AND VEHICLE BUMPER APPARATUS INCLUDING THE SAME

(75) Inventors: Takanobu Kaneko, Kariya (JP); Kiyoichi Kita, Okazaki (JP); Tamaki Obayashi, Toyama (JP); Kyosuke Matsui, Chiryu (JP)

(73) Assignees: Aisin Seiki Kabushiki Kaisha, Kariya-shi (JP); Aisin Keikinzoku Kabushiki Kaisha, Imizu-shi (JP)

( * ) Notice: Subject to any disclaimer, the term of this patent is extended or adjusted under 35 U.S.C. 154(b) by 0 days.

(21) Appl. No.: 13/616,779

(22) Filed: Sep. 14, 2012

(65) Prior Publication Data
US 2013/0076052 A1   Mar. 28, 2013

(30) Foreign Application Priority Data

Sep. 26, 2011   (JP) ................................ 2011-208689

(51) Int. Cl.
   *B60R 19/34*   (2006.01)
(52) U.S. Cl.
   USPC ....... 293/133; 293/155; 188/377; 296/187.03
(58) Field of Classification Search
   CPC ............................... B60R 19/34; B62D 21/15
   USPC ........... 296/203.02, 187.09, 187.03; 293/155, 293/120, 121, 132, 133; 188/377
   See application file for complete search history.

(56) References Cited

U.S. PATENT DOCUMENTS

| | | | | |
|---|---|---|---|---|
| 3,412,628 A | * | 11/1968 | De Gain | 74/492 |
| 3,785,290 A | * | 1/1974 | Castor et al. | 102/388 |
| 5,732,801 A | * | 3/1998 | Gertz | 188/377 |
| 5,913,565 A | * | 6/1999 | Watanabe | 296/187.03 |
| 6,068,330 A | * | 5/2000 | Kasuga et al. | 296/187.09 |
| 6,393,999 B1 | * | 5/2002 | Schneider | 105/392.5 |
| 6,588,830 B1 | * | 7/2003 | Schmidt et al. | 296/187.09 |
| 6,752,451 B2 | * | 6/2004 | Sakamoto et al. | 296/187.03 |

(Continued)

FOREIGN PATENT DOCUMENTS

| | | |
|---|---|---|
| DE | 101 08 279 A1 | 9/2001 |
| JP | 2008-120324 A | 5/2008 |
| JP | 2009-61845 A | 3/2009 |
| WO | WO 2007/075659 A2 | 7/2007 |

OTHER PUBLICATIONS

Extended European Search Report issued Feb. 22, 2013 in Patent Application No. 12185827.8.

*Primary Examiner* — Glenn Dayoan
*Assistant Examiner* — Pinel Romain
(74) *Attorney, Agent, or Firm* — Oblon, Spivak, McClelland, Maier & Neustadt, L.L.P.

(57) ABSTRACT

A crush box arranged between a side member of a vehicle body and a bumper reinforcement member, the crush box including: a main body portion arranged in a longitudinal direction of a vehicle and formed in a tubular shape, the main body portion having first and second portions; a vehicle body attaching portion arranged at a first end of the main body portion; and a bumper attaching portion arranged at a second end of the main body portion, wherein vertical cross-sections of both the first portion adjacent to the vehicle body attaching portion and the second portion adjacent to the bumper attaching portion are polygonal shapes, and the number of vertices of the polygonal shape of the vertical cross-section of the second portion is greater than the number of vertices of the polygonal shape of the vertical cross-section of the first portion.

14 Claims, 5 Drawing Sheets

(56) References Cited

U.S. PATENT DOCUMENTS

| | | | |
|---|---|---|---|
| 6,779,821 B2* | 8/2004 | Hallergren | 293/133 |
| 6,854,574 B2* | 2/2005 | Yoshida et al. | 188/371 |
| 6,863,321 B2* | 3/2005 | Jonsson et al. | 293/102 |
| 6,908,129 B2* | 6/2005 | Shimotsu | 293/133 |
| 7,066,509 B2* | 6/2006 | Kollaritsch et al. | 293/133 |
| 7,354,030 B2* | 4/2008 | Murayama et al. | 267/140 |
| 7,357,445 B2* | 4/2008 | Gross et al. | 296/187.09 |
| 7,360,811 B2* | 4/2008 | Roll et al. | 293/133 |
| 7,631,924 B2* | 12/2009 | Nilsson | 296/133 |
| 7,677,617 B2* | 3/2010 | Stewart et al. | 293/133 |
| 7,896,411 B2* | 3/2011 | Kano et al. | 293/133 |
| 8,020,906 B2* | 9/2011 | Schmid et al. | 293/133 |
| 8,157,066 B2* | 4/2012 | Murayama et al. | 188/371 |
| 8,177,044 B2* | 5/2012 | Murayama et al. | 188/377 |
| 8,210,583 B2* | 7/2012 | Wavde et al. | 293/132 |
| 8,276,955 B2* | 10/2012 | Baccouche et al. | 293/133 |
| 2001/0038231 A1 | 11/2001 | Takemoto et al. | |
| 2006/0028038 A1 | 2/2006 | Glasgow et al. | |
| 2007/0187960 A1 | 8/2007 | Evans | |
| 2012/0228073 A1* | 9/2012 | Perarnau Ramos et al. | 188/377 |

* cited by examiner

CRUSH BOX AND VEHICLE BUMPER APPARATUS INCLUDING THE SAME

CROSS REFERENCE TO RELATED APPLICATIONS

This application is based on and claims priority under 35 U.S.C. §119 to Japanese Patent Application 2011-208689, filed on Sep. 26, 2011, the entire content of which is incorporated herein by reference.

TECHNICAL FIELD

This disclosure generally relates to a crush box and a vehicle bumper apparatus including the crush box.

BACKGROUND DISCUSSION

Each of JP2008-120324A and JP2009-61845A (which will be hereinafter referred to as References 1 and 2) discloses a known vehicle bumper apparatus to which a known crush box is applied (the crush box disclosed in Reference 1 is referred to as an energy absorbing member). The vehicle bumper apparatus is configured so that a bumper reinforcement member is supported by the crush box and mounted thereby to a side member of a vehicle body of a vehicle (for example, the crush box is crushed by a collision of the vehicle and therefore absorbs an impact energy generated by the collision).

According to References 1 and 2, the crush box of the vehicle bumper apparatus is configured to stably obtain an impact energy absorbing load (i.e., a load for absorbing an impact energy). However, the crush box disclosed in each of References 1 and 2 may not be configured in consideration for unexpected variations, for example, external disturbances or errors in design, so as to be resistant to such variations (that is, the crush box of each of References 1 and 2 is not configured so as to secure robustness).

A need thus exists for a crush box and a vehicle bumper apparatus, which are not susceptible to the drawbacks mentioned above.

SUMMARY

According to an aspect of this disclosure, a crush box arranged between a side member of a vehicle body and a bumper reinforcement member, the crush box including: a main body portion arranged in a longitudinal direction of a vehicle and formed in a tubular shape, the main body portion having first and second portions; a vehicle body attaching portion arranged at a first end of the main body portion and positioned adjacent to the vehicle body relative to the main body portion; and a bumper attaching portion arranged at a second end of the main body portion and positioned adjacent to the bumper reinforcement member relative to the main body portion, wherein vertical cross-sections of both the first portion adjacent to the vehicle body attaching portion and the second portion adjacent to the bumper attaching portion are polygonal shapes, and the number of vertices of the polygonal shape of the vertical cross-section of the second portion is greater than the number of vertices of the polygonal shape of the vertical cross-section of the first portion.

According to another aspect of the disclosure, a crush box arranged between a side member of a vehicle body and a bumper reinforcement member, the crush box including: a main body portion arranged in a longitudinal direction of a vehicle and formed in a tubular shape, the main body portion having first and second portions; a vehicle body attaching portion arranged at a first end of the main body portion and positioned adjacent to the vehicle body relative to the main body portion; and a bumper attaching portion arranged at a second end of the main body portion and positioned adjacent to the bumper reinforcement member relative to the main body portion, wherein a vertical cross-section of the first portion adjacent to the vehicle body attaching portion is a polygonal shape and a vertical cross-section of the second portion adjacent to the bumper attaching portion is a circular shape.

According to still another aspect of the disclosure, a vehicle bumper apparatus includes a crush box supporting a bumper reinforcement member to mount the bumper reinforcement member to a side member of a vehicle body, the crush box including: a main body portion arranged in a longitudinal direction of a vehicle and formed in a tubular shape, the main body portion having first and second portions; a vehicle body attaching portion arranged at a first end of the main body portion and positioned adjacent to the vehicle body relative to the main body portion; and a bumper attaching portion arranged at a second end of the main body portion and positioned adjacent to the bumper reinforcement member relative to the main body portion, wherein a vertical cross-section of the first portion adjacent to the vehicle body attaching portion is a polygonal shape and a vertical cross-section of the second portion adjacent to the bumper attaching portion is a circular or polygonal shape, and the number of vertices of the polygonal shape of the vertical cross-section of the second portion is greater than the number of vertices of the polygonal shape of the vertical cross-section of the first portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
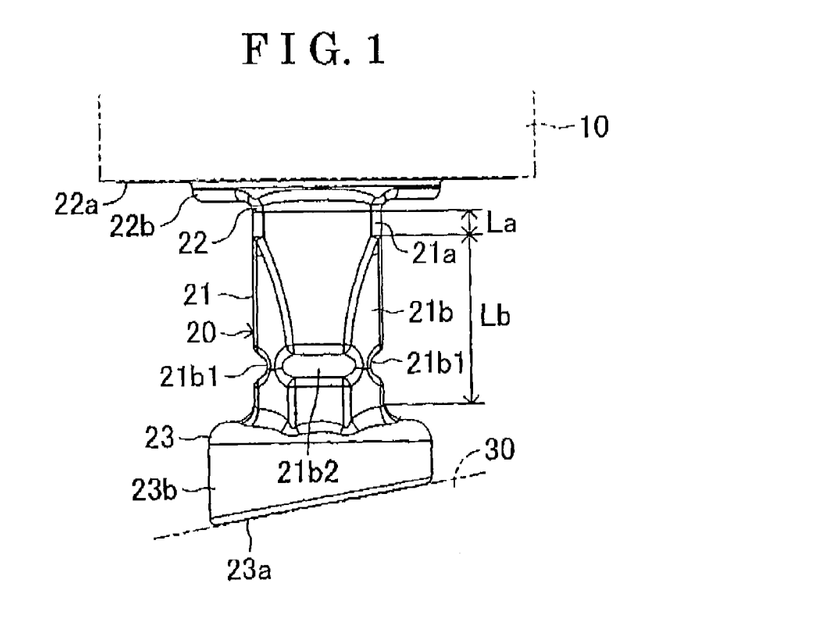
FIG. 1 is a plain view of a vehicle bumper apparatus to which a crush box according to a first embodiment disclosed here is applied.

A first embodiment of this disclosure will be explained as follows with reference to the illustrations of the attached drawings. A crush box 20 according to the first embodiment of the disclosure is illustrated in FIGS. 1 to 4. In the first embodiment, the crush box 20 made of an aluminum alloy is applied to a vehicle bumper apparatus arranged at a front side of a vehicle. The vehicle bumper apparatus is configured so that a bumper reinforcement member 30 is supported by the crush box 20 and mounted thereby to a side member 10 of a vehicle body of the vehicle (a symmetrical pair of side members 10 is arranged at right and left sides of the vehicle in a width direction thereof; however, the side member 10 arranged at the right side of the vehicle is illustrated in FIG. 1). The side member 10 arranged at the right side (a side) of the vehicle in the width direction has a relatively high rigidity in a longitudinal direction of the vehicle (the longitudinal direction will be hereinafter referred to as a vehicle longitudinal direction), compared to rigidities of other portions of the vehicle body in the longitudinal direction. The side member 10 is formed to have a polygonal shape, for example, a quadrilateral shape in a vertical cross-section. The quadrilateral shape of the vertical cross-section of the side member 10 may have a different shape from the quadrilateral shape.

The crush box 20 is crushed by a load in the vehicle longitudinal direction and therefore absorbs an impact energy caused by the load. The crush box 20 is arranged at a front side of the side member 10 so as to extend along the vehicle longitudinal direction. The crush box 20 includes a main body portion 21 having a tubular shape, a vehicle body attaching portion 22, and a bumper attaching portion 23. The main body portion 21 is arranged at an intermediate portion of the crush box 20 in the vehicle longitudinal direction. The vehicle body attaching portion 22 is arranged at a rear side (a first end) of the main body portion 21 and is positioned adjacent to the vehicle body relative to the main body portion 21. The bumper attaching portion 23 is arranged at a front side (a second end) of the main body portion 21 and is positioned adjacent to the bumper reinforcement member 30 relative to the main body portion 21.

The main body portion 21 includes a rear portion 21a (a first portion adjacent to the vehicle body attaching portion 22) and a front portion 21b (a second portion adjacent to the bumper attaching portion 23). A vertical cross-section of each of the rear portion 21a and the front portion 21b is formed in a polygonal shape. The vertical cross-section of the rear portion 21a is a substantially quadrilateral shape while the vertical cross-section of the front portion 21b is a substantially octagon shape. Thus, the vertical cross-section of the front portion 21b is formed in the polygonal shape, the number of vertices of which is greater than the number of vertices of the polygonal shape of the vertical cross-section of the rear portion 21a. Here, the polygonal shape of the vertical cross-section of the rear portion 21a of the main body portion 21 is identical or substantially identical to the polygonal shape of the vertical cross-section of the side member 10. In addition, a length La of the rear portion 21a in the vehicle longitudinal direction is set to be shorter than a length Lb of the front portion 21b in the vehicle longitudinal direction.

According to the first embodiment, portions positioned at the front side of the main body portion 21 and corresponding to the four vertices (corners) of the rear portion 21a are processed into an octagon shape; thereby, the front portion 21b having the octagon shape is formed. Further, a symmetric pair of beads 21b1 is formed at right and left sides of the front portion 21b and a symmetric pair of beads 21b2 is formed at upper and lower sides of the front portion 21b. For example, when an impact acts on the crush box 20, the crush box 20 is configured to start being crushed at each of the beads 21b1 and 21b2.

Figure 2:
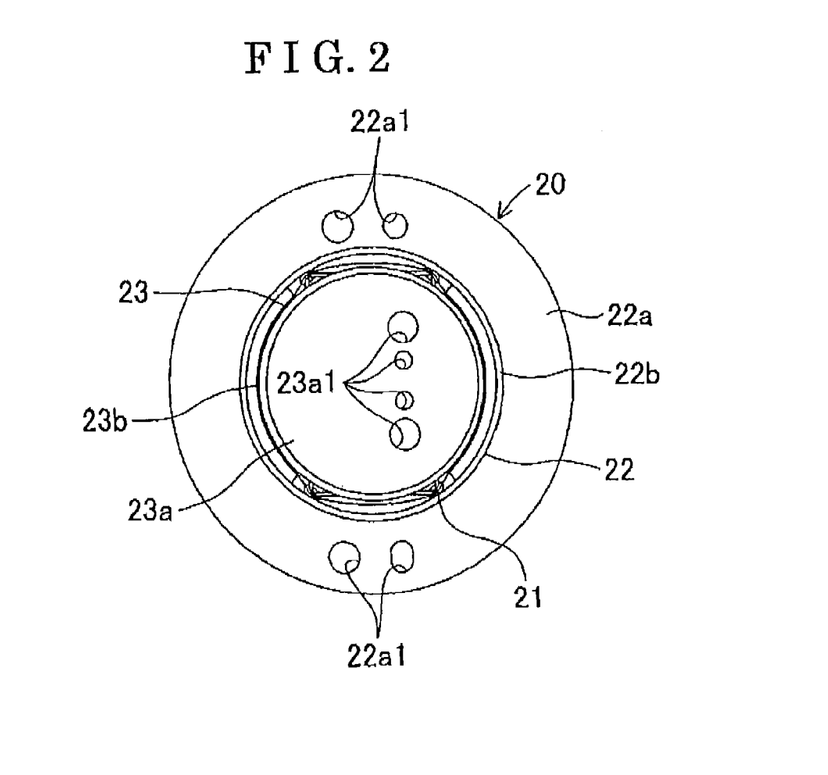
FIG. 2 is a front view of the crush box illustrated in FIG. 1.
Figure 4:
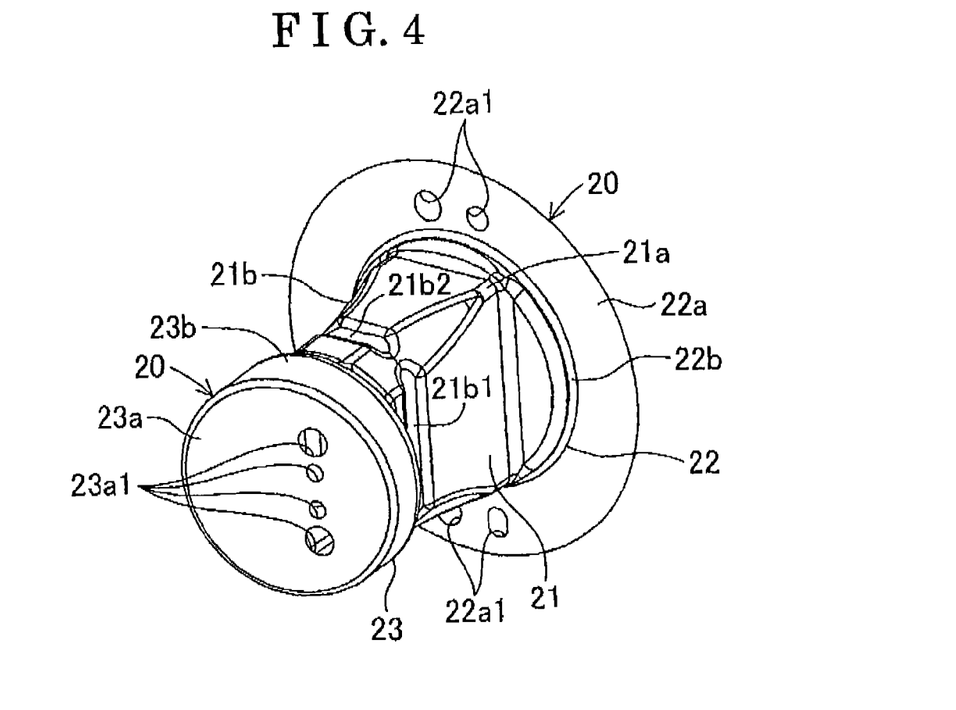
FIG. 4 is a front perspective view of the crush box illustrated in FIG. 1.
Figure 5:
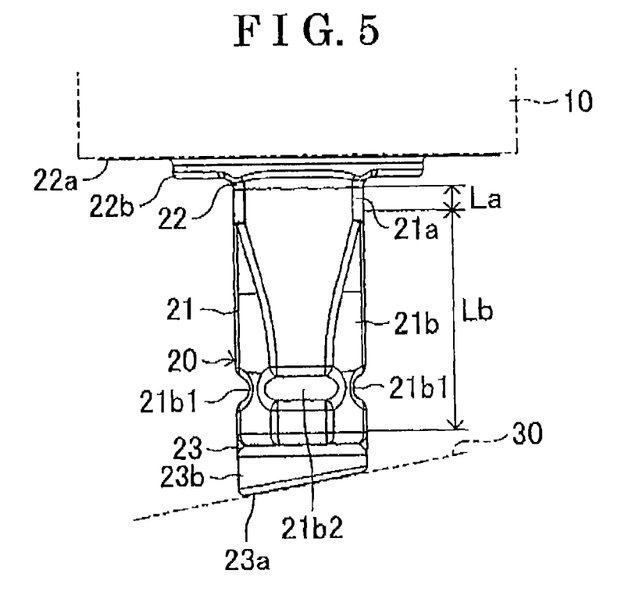
FIG. 5 is a plain view of the vehicle bumper apparatus to which the crush box according to a second embodiment disclosed here is applied.
Figure 6:
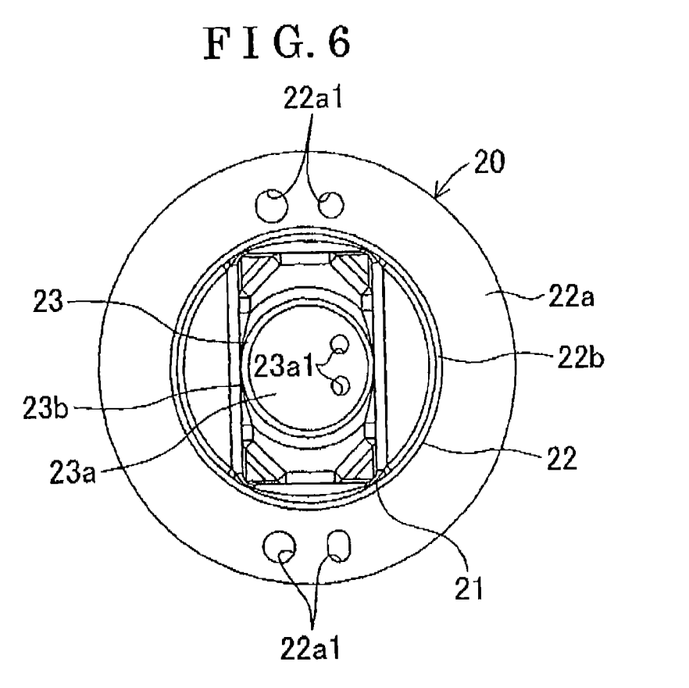
FIG. 6 is a front view of the crush box illustrated in FIG. 5.
Figure 7:
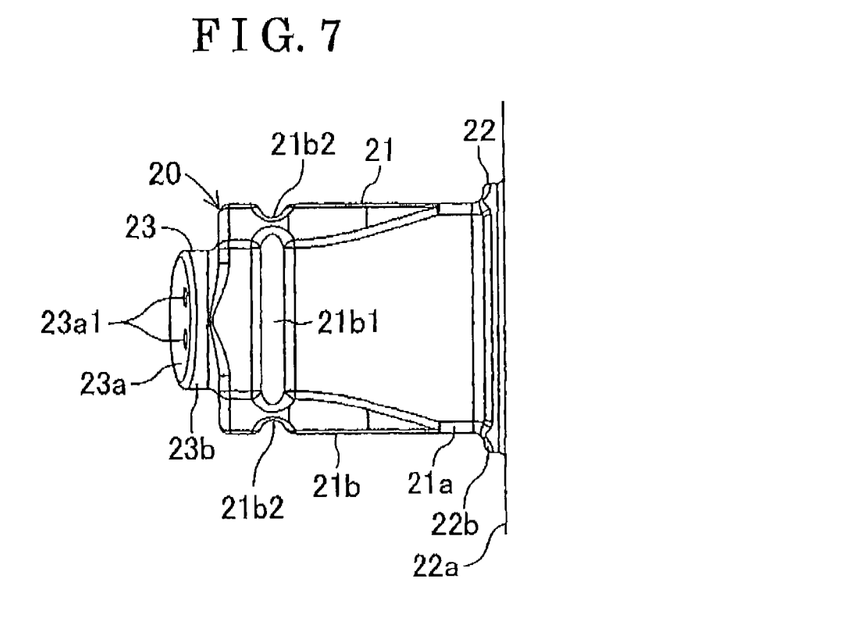
FIG. 7 is a right side view of the crush box illustrated in FIG. 5.
Figure 8:
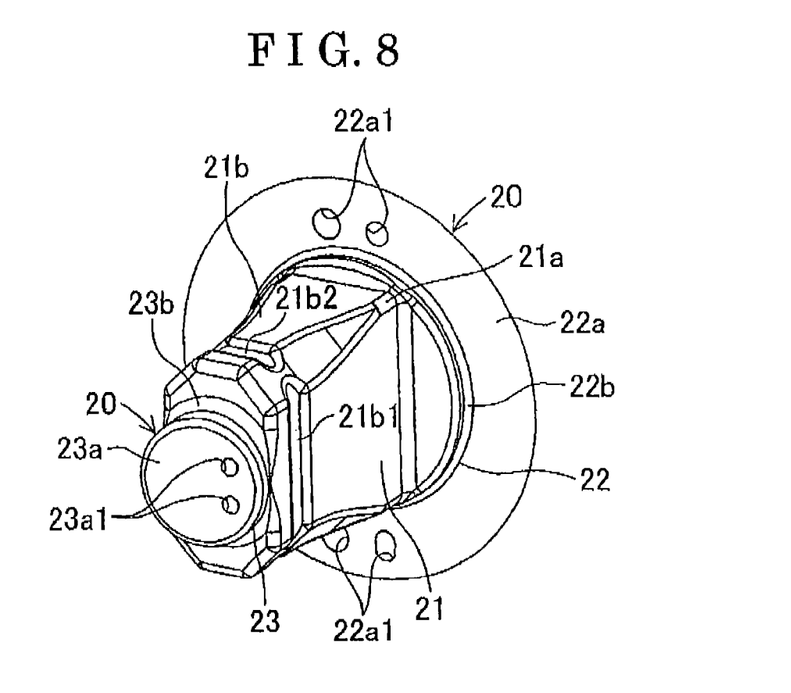
FIG. 8 is a front perspective view of the crush box Illustrated in FIG. 5.

The vehicle body attaching portion 22 includes an annular flange portion 22a and a circular connecting portion 22b. The crush box 20 is attached via the annular flange portion 22a to the side member 10. As illustrated in FIGS. 2 and 4, four attachment bores 22a1 are formed in the annular flange portion 22a. Shaft portions of attachment bolts for fixing the crush box 20 to the side member 10 may be inserted in the attachment bores 22a1. The annular flange portion 22a is connected via the circular connecting portion 22b to the rear portion 21a of the main body portion 21.

Figure 3:
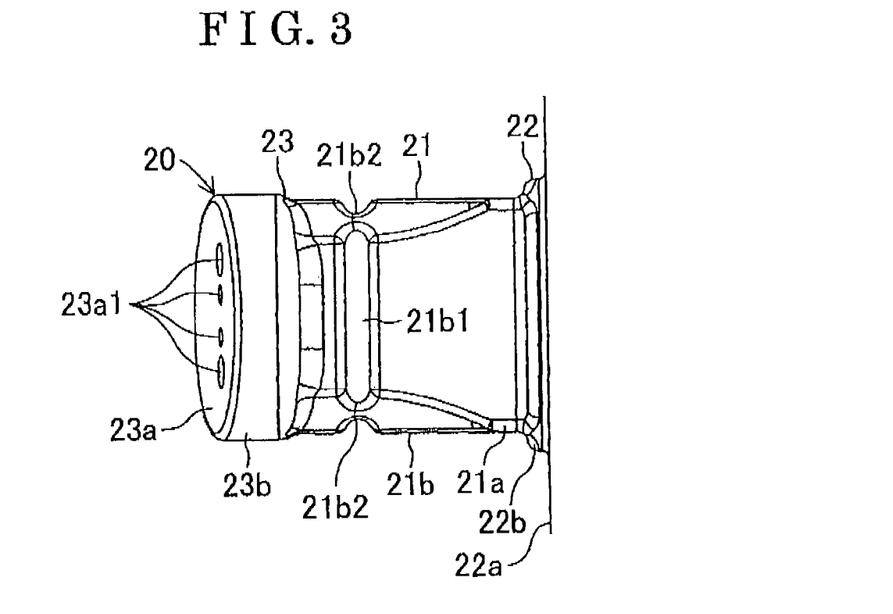
FIG. 3 is a right side view of the crush box illustrated in FIG. 1.

The bumper attaching portion 23 includes a disk-shaped attaching portion 23a and a circular connecting portion 23b. The bumper reinforcement member 30 is attached via the disk-shaped attaching portion 23a to the crush box 20. As illustrated in FIGS. 2 to 4, four attachment bores 23a1 are formed in the disk-shaped attaching portion 23a. Shaft portions of attachment bolts for fixing the bumper reinforcement member 30 to the crush box 20 may be inserted in the attachment bores 23a1. The disk-shaped attaching portion 23a is connected via the circular connecting portion 23b to the front portion 21b of the main body portion 21. The circular connecting portion 23b is configured to have a diameter smaller than a diameter of the circular connecting portion 22b of the vehicle body attaching portion 22.

The bumper reinforcement member 30 is supported by a symmetric pair of crush boxes 20 arranged in the width direction of the vehicle (the width direction of the vehicle will be hereinafter referred to as a vehicle width direction). The bumper reinforcement member 30 is formed from an extrudate having a closed cross section, into a predetermined shape, thereby forming the bumper reinforcement member 30 (i.e., the bumper reinforcement member 30 Is formed from the extrudate so as to have right and left end portions curved toward a rear side of the vehicle, and an intermediate portion linearly extending substantially along the vehicle width direction), Four bolt insertion bores are formed in the bumper reinforcement member 30 so as to be provided at positions corresponding to the attachment bores 23a1 of the bumper attaching portion 23 of the crush box 20. According to the first embodiment, the bumper reinforcement member 30 is formed from the extrudate having the closed cross section. Alternatively, the bumper reinforcement member 30 may be formed, for example, from an extrudate having an opened cross section. In addition, the bumper reinforcement member 30 may be formed by press forming.

In the first embodiment, portions of the crush box 20 from which the annular flange portion 22a and the disk-shaped attaching portion 23a are excluded, are integrally formed from a square or circular tube serving as a base material, for example, by hydroforming process (the square tube corresponds to a tubular member having a quadrilateral shape in cross-section and the circular tube corresponds to a tubular member having a circular shape in cross-section). That is, the whole main body portion 21, a portion of the vehicle body attaching portion 22, and a portion of the bumper attaching portion 23 are integrally formed from the square or circular tube by hydroforming process, Hereinafter, the portions integrally formed from the square or circular tube will be referred to as an integrally formed portion. In addition, the annular flange portion 22a and the disk-shaped attaching portion 23a are bonded (welded) to the integrally formed portion formed from the square or circular tube serving as the base material.

Figure 10:
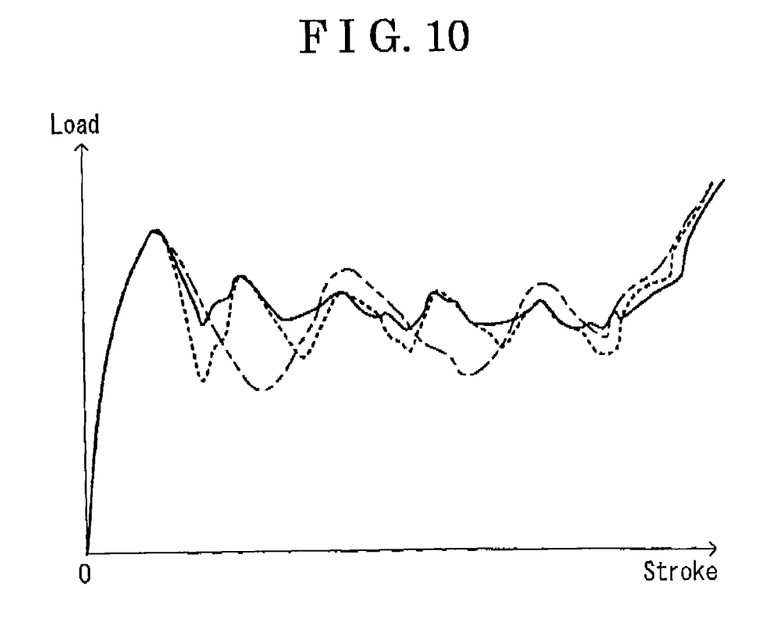
FIG. 10 is a chart of characteristic lines each indicating a relation between a load and a stroke when a main body portion of the crush box is crushed.

According to the first embodiment, the rear portion 21a of the main body portion 21 of the crush box 20 is configured to have the quadrilateral shape in the vertical cross-section. That is, the main body portion 21 includes a polygonal bottom portion adjacent to the side member 10; thereby, the crush box 20 may be resistant to a fracture of the bottom portion to therefore secure robustness. Further, the front portion 21b of the main body portion 21 of the crush box 20 is configured to have the octagon shape in the vertical cross-section. Therefore, an impact energy absorbing load (i.e., a load for absorbing an impact energy) obtained when the crush box 20 is crushed, may be stable at high level (see a continuous line in a chart of FIG. 10). Consequently, according to the first embodiment, both a high rate of impact energy absorption and a high robustness may be obtained by the crush box 20. The continuous line in the chart of FIG. 10 is a characteristic line indicating a relationship between a load and a stroke (an amount of deformation) in a case where the vertical cross-section of the front portion 21*b* is the octagon shape. A dashed line in the chart of FIG. 10 is a characteristic line indicating a relation between a load and a stroke (an amount of deformation) in a case where the vertical cross-section of the front portion 21*b* is a hexagonal shape. A chain double-dashed line in the chart of FIG. 10 is a characteristic line indicating a relationship between a load and a stroke (an amount of deformation) in a case where the vertical cross-section of the front portion 21*b* is a quadrilateral shape.

Moreover, according to the first embodiment, the main body portion 21 of the crush box 20 is formed by the integrally formed portion (the main body portion 21 is integrally formed from the square or circular tube, for example, by hydroforming process). As a result, the crush box 20 may be formed at low cost compared to a case where the main body portion 21 of the crush box 20 is formed of multiple plate-like materials by press forming, welding process, and the like, resulting in a cost reduction.

A second embodiment of the disclosure will be explained as follows with reference to FIGS. 5 to 8. According to the crush box 20 of the second embodiment, the shape of the bumper attaching portion 23 is small compared to that of the first embodiment. In addition, other configurations of the second embodiment are substantially similar to those of the first embodiment; therefore, the same numbers will be assigned to the same portions as those of the first embodiment and detailed explanations of the same portions as those of the first embodiment will be hereinafter omitted. Moreover, the substantially same configuration as that of the first embodiment is applied to the main body portion 21 of the crush box 20 according to the second embodiment; therefore, effects similar to those of the first embodiment may be obtained by the second embodiment.

Figure 9:
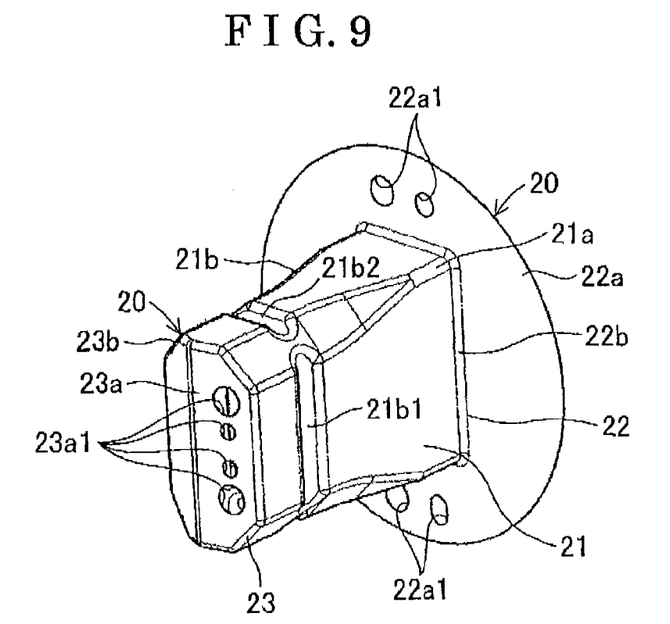
FIG. 9 is a perspective view of the crush box according to a third embodiment disclosed here.

A third embodiment of the disclosure will be explained as follows with reference to FIG. 9. According to the crush box 20 of the third embodiment, the front portion 21*b* of the main body portion 21 is formed in a shape (an octagon shape) extending forward in a front-rear direction of the crush box 20. In addition, other configurations of the third embodiment are substantially similar to those of the first embodiment; therefore, the same numbers will be assigned to the same portions as those of the first embodiment and detailed explanations of the same portions as those of the first embodiment will be hereinafter omitted. Moreover, the substantially same configuration as that of the first embodiment is applied to the main body portion 21 of the crush box 20 according to the third embodiment; therefore, effects similar to those of the first embodiment may be obtained by the third embodiment.

In each of the first, second, and third embodiments, the vertical cross-section of the front portion 21*b* of the main body portion 21 of the crush box 20 is formed in the octagon shape. In the practice of the embodiments of the disclosure, it is appropriate that the vertical cross-section of the front portion 21*b* is formed in the polygonal shape, the number of vertices of which is greater than the number of vertices of the polygonal shape of the vertical cross-section of the rear portion 21*a*. Accordingly, according to each of the first, second, and third embodiments, the vertical cross-section of the rear portion 21*a* is the quadrilateral shape; therefore, it is appropriate that the vertical cross-section of the front portion 21*b* may be formed in a polygonal shape having five or more vertices.

According to each of the first, second, and third embodiments, the vertical cross-section of the rear portion 21*a* of the main body portion 21 of the crush box 20 is formed in the quadrilateral shape. Alternatively, in the practice of the embodiments of the disclosure, the vertical cross-section of the rear portion 21*a* may be formed in a triangular shape having a high robustness. In addition, according to each of the first, second, and third embodiments, the vertical cross-section of the front portion 21*b* of the main body portion 21 of the crush box 20 is formed in the polygonal shape, the number of vertices of which is greater than the number of vertices of the polygonal shape of the vertical cross-section of the rear portion 21*a*. Alternatively, the vertical cross-section of the front portion 21*b* may be formed in a circular shape corresponding to a polygonal shape having a substantially maximum number of vertices.

According to each of the first, second, and third embodiments, the annular flange portion 22*a* of the vehicle body attaching portion 22 and the disk-shaped attaching portion 23*a* of the bumper attaching portion 23 are integrally boned (welded) to the integrally formed portion (the main body portion 21 and the like) of the crush box 20. Alternatively, portions corresponding to the annular flange portion 22*a* and the disk-shaped attaching portion 23*a* may be also integrally formed with the integrally formed portion (the main body portion 21 and the like), for example, by hydroforming process.

According to each of the first, second, and third embodiments, the crush box 20 of the disclosure is applied to the vehicle bumper apparatus provided at the front side of the vehicle. Alternatively, the crush box 20 of the disclosure may be modified to be applied to the vehicle bumper apparatus provided at the rear side of the vehicle.

As described above, according to the aforementioned embodiments, the crush box 20 arranged between the side member 10 of the vehicle body and the bumper reinforcement member 30, the crush box 20 including: the main body portion 21 arranged in the longitudinal direction of the vehicle and formed in the tubular shape, the main body portion 21 having the rear portion 21*a* and the front portion 21*b*; the vehicle body attaching portion 22 arranged at the rear side of the main body portion 21 and positioned adjacent to the vehicle body relative to the main body portion 21; and the bumper attaching portion 23 arranged at the front side of the main body portion 21 and positioned adjacent to the bumper reinforcement member 30 relative to the main body portion 21, wherein the vertical cross-sections of both the rear portion 21*a* adjacent to the vehicle body attaching portion 22 and the front portion 21*b* adjacent to the bumper attaching portion 23 are the polygonal shapes, and the number of vertices of the polygonal shape of the vertical cross-section of the front portion 21*b* is greater than the number of vertices of the polygonal shape of the vertical cross-section of the rear portion 21*a*.

According to the aforementioned embodiments, the vertical cross-section of the side member 10 is the polygonal shape, and the polygonal shape of the vertical cross-section of the side member 10 is identical to the polygonal shape of the vertical cross-section of the rear portion 21*a* of the main body portion 21.

According to the aforementioned embodiments, the vertical cross-section of the rear portion 21*a* of the main body portion 21 and the vertical cross-section of the side member 10 are the quadrilateral shapes, and the vertical cross-section of the front portion 21b of the main body portion 21 is the octagon shape.

According to the aforementioned configuration, the vertical cross-section of the rear portion 21a (corresponding to the polygonal bottom portion adjacent to the side member 10) of the main body portion 21 of the crush box 20 has the polygonal shape resistant to the fracture of the bottom portion; therefore, the crush box 20 may secure the robustness (the polygonal shape of the rear portion 21a is, for example, a quadrilateral or triangle shape having the number of vertices that is smaller than the number of vertices of the polygonal shape of the vertical cross-section of the front portion 21b). Further, the vertical cross-section of the front portion 21b of the main body portion 21 of the crush box 20 has the polygonal or circular shape having the number of vertices that is greater than the number of vertices of the polygonal shape of the vertical cross-section of the rear portion 21a. Therefore, an impact energy absorbing load (i.e., a load for absorbing an impact energy) obtained when the crush box 20 is crushed, may be stable at high level. Consequently, both a high rate of impact energy absorption and a high robustness may be obtained by the crush box 20.

According to the aforementioned embodiments, the main body portion 21 of the crush box 20 is the integrally formed portion.

According to the aforementioned configuration, the main body portion 21 is integrally formed from the square or circular tube, for example, by hydroforming process (the square tube corresponds to a tubular member having a quadrilateral shape in cross-section and the circular tube corresponds to a tubular member having a circular shape in cross-section). As a result, the crush box 20 may be formed at low cost compared to a case where the main body portion 21 of the crush box 20 is formed of multiple plate-like materials by press forming, welding process, and the like, resulting in a cost reduction.

According to the aforementioned embodiments, the main body portion 21, the vehicle body attaching portion 22, and the bumper attaching portion 23 are integrally formed with one another.

According to the aforementioned embodiments, the crush box 20 arranged between the side member 10 of the vehicle body and the bumper reinforcement member 30, the crush box 20 including: the main body portion 21 arranged in the longitudinal direction of the vehicle and formed in the tubular shape, the main body portion 21 having the rear portion 21a and the front portion 21b; the vehicle body attaching portion 22 arranged at the rear side of the main body portion 21 and positioned adjacent to the vehicle body relative to the main body portion 21; and the bumper attaching portion 23 arranged at the front side of the main body portion 21 and positioned adjacent to the bumper reinforcement member 30 relative to the main body portion 21, wherein the vertical cross-section of the rear portion 21a adjacent to the vehicle body attaching portion 22 is the polygonal shape and the vertical cross-section of the front portion 21b adjacent to the bumper attaching portion 23 is the circular shape.

According to the aforementioned embodiments, the vertical cross-section of the side member 10 is the polygonal shape, and the polygonal shape of the vertical cross-section of the side member 10 is identical to the polygonal shape of the vertical cross-section of the rear portion 21a of the main body portion 21.

According to the aforementioned embodiments, the vertical cross-section of the rear portion 21a of the main body portion 21 and the vertical cross-section of the side member 10 are the quadrilateral shapes, and the vertical cross-section of the front portion 21b of the main body portion 21 is the octagon shape.

According to the aforementioned configuration, the vertical cross-section of the rear portion 21a (corresponding to the polygonal bottom portion adjacent to the side member 10) of the main body portion 21 of the crush box 20 has the polygonal shape resistant to the fracture of the bottom portion; therefore, the crush box 20 may secure the robustness (the polygonal shape of the rear portion 21a is, for example, a quadrilateral or triangle shape having the number of vertices that is smaller than the number of vertices of the polygonal shape of the vertical cross-section of the front portion 21b). Further, the vertical cross-section of the front portion 21b of the main body portion 21 of the crush box 20 has the polygonal or circular shape having the number of vertices that is greater than the number of vertices of the polygonal shape of the vertical cross-section of the rear portion 21a. Therefore, an impact energy absorbing load (i.e., a load for absorbing an impact energy) obtained when the crush box 20 is crushed, may be stable at high level. Consequently, both a high rate of impact energy absorption and a high robustness may be obtained by the crush box 20.

According to the aforementioned embodiments, the main body portion 21 of the crush box 20 is the integrally formed portion.

According to the aforementioned configuration, the main body portion 21 is integrally formed from the square or circular tube, for example, by hydroforming process (the square tube corresponds to a tubular member having a quadrilateral shape in cross-section and the circular tube corresponds to a tubular member having a circular shape in cross-section). As a result, the crush box 20 may be formed at low cost compared to a case where the main body portion 21 of the crush box 20 is formed of multiple plate-like materials by press forming, welding process, and the like, resulting in a cost reduction.

According to the aforementioned embodiments, the main body portion 21, the vehicle body attaching portion 22, and the bumper attaching portion 23 are integrally formed with one another.

According to the aforementioned embodiments, the vehicle bumper apparatus includes the crush box 20 supporting the bumper reinforcement member 30 to mount the bumper reinforcement member 30 to the side member 10 of the vehicle body, the crush box 20 including: the main body portion 21 arranged in the longitudinal direction of the vehicle and formed in the tubular shape, the main body portion 21 having the rear portion 21a and the front portion 21b; the vehicle body attaching portion 22 arranged at the rear side of the main body portion 21 and positioned adjacent to the vehicle body relative to the main body portion 21; and the bumper attaching portion 23 arranged at the front side of the main body portion 21 and positioned adjacent to the bumper reinforcement member 30 relative to the main body portion 21, wherein the vertical cross-section of the rear portion 21a adjacent to the vehicle body attaching portion 22 is the polygonal shape and the vertical cross-section of the front portion 21b adjacent to the bumper attaching portion 23 is the circular or polygonal shape, and the number of vertices of the polygonal shape of the vertical cross-section of the front portion 21b is greater than the number of vertices of the polygonal shape of the vertical cross-section of the rear portion 21a.

According to the aforementioned embodiments, the vertical cross-section of the side member 10 is the polygonal shape, and the polygonal shape of the vertical cross-section of the side member 10 is identical to the polygonal shape of the vertical cross-section of the rear portion 21a of the main body portion 21.

According to the aforementioned embodiments, the vertical cross-section of the rear portion 21a of the main body portion 21 and the vertical cross-section of the side member 10 are the quadrilateral shapes, and the vertical cross-section of the front portion 21b of the main body portion 21 is the octagon shape.

According to the aforementioned configuration, the vertical cross-section of the rear portion 21a (corresponding to the polygonal bottom portion adjacent to the side member 10) of the main body portion 21 of the crush box 20 has the polygonal shape resistant to the fracture of the bottom portion; therefore, the crush box 20 may secure the robustness (the polygonal shape of the rear portion 21a is, for example, a quadrilateral or triangle shape having the number of vertices that is smaller than the number of vertices of the polygonal shape of the vertical cross-section of the front portion 21b). Further, the vertical cross-section of the front portion 21b of the main body portion 21 of the crush box 20 has the polygonal or circular shape having the number of vertices that is greater than the number of vertices of the polygonal shape of the vertical cross-section of the rear portion 21a. Therefore, an impact energy absorbing load (i.e., a load for absorbing an impact energy) obtained when the crush box 20 is crushed, may be stable at high level. Consequently, both a high rate of impact energy absorption and a high robustness may be obtained by the crush box 20.

According to the aforementioned embodiments, the main body portion 21 of the crush box 20 is the integrally formed portion.

According to the aforementioned configuration, the main body portion 21 is integrally formed from the square or circular tube, for example, by hydroforming process (the square tube corresponds to a tubular member having a quadrilateral shape in cross-section and the circular tube corresponds to a tubular member having a circular shape in cross-section). As a result, the crush box 20 may be formed at low cost compared to a case where the main body portion 21 of the crush box 20 is formed of multiple plate-like materials by press forming, welding process, and the like, resulting in a cost reduction.

According to the aforementioned embodiments, the main body portion 21, the vehicle body attaching portion 22, and the bumper attaching portion 23 are integrally formed with one another.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A crush box arranged between a side member of a vehicle body and a bumper reinforcement member, the crush box comprising:
a main body portion arranged in a longitudinal direction of a vehicle and formed in a tubular shape, the main body portion including first and second portions;
a vehicle body attaching portion arranged at a first end of the main body portion and positioned adjacent to the vehicle body relative to the main body portion; and
a bumper attaching portion arranged at a second end of the main body portion and positioned adjacent to the bumper reinforcement member relative to the main body portion,
wherein vertical cross-sections of both the first portion adjacent to the vehicle body attaching portion and the second portion adjacent to the bumper attaching portion are polygonal shapes, and the number of vertices of the polygonal shape of the vertical cross-section of the second portion is greater than the number of vertices of the polygonal shape of the vertical cross-section of the first portion,
wherein the main body portion is an integrally formed portion, and
wherein shapes of the vertical cross-sections of both the first portion adjacent to the vehicle body attaching portion and the second portion adjacent to the bumper attaching portion are inhibited from including projecting portions respectively, and the crush box is crushed inwardly relative to one of the first portion and the second portion in a vertical cross-sectional view in a case where the crush box is crushed.

2. The crush box according to claim 1, wherein a vertical cross-section of the side member is a polygonal shape, and the polygonal shape of the vertical cross-section of the side member is identical to the polygonal shape of the vertical cross-section of the first portion of the main body portion.

3. The crush box according to claim 1, wherein the vertical cross-section of the first portion of the main body portion and the vertical cross-section of the side member are quadrilateral shapes, and the vertical cross-section of the second portion of the main body portion is an octagon shape.

4. The crush box according to claim 1, wherein the main body portion, the vehicle body attaching portion, and the bumper attaching portion are integrally formed with one another.

5. The crush box according to claim 1, wherein a first pair of symmetric beads is formed at right and left sides of the second portion of the main body portion, and a second pair of symmetric beads is formed at upper and lower sides of the second portion of the main body portion.

6. A crush box arranged between a side member of a vehicle body and a bumper reinforcement member, the crush box comprising:
a main body portion arranged in a longitudinal direction of a vehicle and formed in a tubular shape, the main body portion including first and second portions;
a vehicle body attaching portion arranged at a first end of the main body portion and positioned adjacent to the vehicle body relative to the main body portion; and
a bumper attaching portion arranged at a second end of the main body portion and positioned adjacent to the bumper reinforcement member relative to the main body portion,
wherein a vertical cross-section of the first portion adjacent to the vehicle body attaching portion is a polygonal shape and a vertical cross-section of the second portion adjacent to the bumper attaching portion is a circular shape,
wherein the main body portion is an integrally formed portion, and
wherein shapes of the vertical cross-sections of both the first portion adjacent to the vehicle body attaching portion and the second portion adjacent to the bumper attaching portion are inhibited from including projecting portions respectively, and the crush box is crushed inwardly relative to one of the first portion and the second portion in a vertical cross-sectional view in a case where the crush box is crushed.

7. The crush box according to claim 6, wherein a vertical cross-section of the side member is a polygonal shape, and the polygonal shape of the vertical cross-section of the side member is identical to the polygonal shape of the vertical cross-section of the first portion of the main body portion.

8. The crush box according to claim 6, wherein the main body portion, the vehicle body attaching portion, and the bumper attaching portion are integrally formed with one another.

9. The crush box according to claim 6, wherein a first pair of symmetric beads is formed at right and left sides of the second portion of the main body portion, and a second pair of symmetric beads is formed at upper and lower sides of the second portion of the main body portion.

10. A vehicle bumper apparatus, comprising:
    a crush box supporting a bumper reinforcement member to mount the bumper reinforcement member to a side member of a vehicle body,
    the crush box comprising:
        a main body portion arranged in a longitudinal direction of a vehicle and formed in a tubular shape, the main body portion including first and second portions;
        a vehicle body attaching portion arranged at a first end of the main body portion and positioned adjacent to the vehicle body relative to the main body portion; and
        a bumper attaching portion arranged at a second end of the main body portion and positioned adjacent to the bumper reinforcement member relative to the main body portion,
    wherein a vertical cross-section of the first portion adjacent to the vehicle body attaching portion is a polygonal shape and a vertical cross-section of the second portion adjacent to the bumper attaching portion is a circular or polygonal shape, and the number of vertices of the polygonal shape of the vertical cross-section of the second portion is greater than the number of vertices of the polygonal shape of the vertical cross-section of the first portion,
    wherein the main body portion of the crush box is an integrally formed portion, and
    wherein shapes of the vertical cross-sections of both the first portion adjacent to the vehicle body attaching portion and the second portion adjacent to the bumper attaching portion are inhibited from including projecting portions respectively, and the crush box is crushed inwardly relative to one of the first portion and the second portion in a vertical cross-sectional view in a case where the crush box is crushed.

11. The vehicle bumper apparatus according to claim 10, wherein a vertical cross-section of the side member is a polygonal shape, and the polygonal shape of the vertical cross-section of the side member is identical to the polygonal shape of the vertical cross-section of the first portion of the main body portion.

12. The vehicle bumper apparatus according to claim 10, wherein the vertical cross-section of the first portion of the main body portion and the vertical cross-section of the side member are quadrilateral shapes, and the vertical cross-section of the second portion of the main body portion is a polygonal shape having an octagon shape.

13. The vehicle bumper apparatus according to claim 10, wherein the main body portion, the vehicle body attaching portion, and the bumper attaching portion are integrally formed with one another.

14. The vehicle bumper apparatus according to claim 10, wherein a first pair of symmetric beads is formed at right and left sides of the second portion of the main body portion, and a second pair of symmetric beads is formed at upper and lower sides of the second portion of the main body portion.

* * * * *